(12) United States Patent
Fukazawa et al.

(10) Patent No.: US 8,140,561 B2
(45) Date of Patent: Mar. 20, 2012

(54) SERVICE RECOMMENDATION SYSTEM AND SERVICE RECOMMENDATION METHOD

(75) Inventors: Yusuke Fukazawa, Yokosuka (JP); Takefumi Naganuma, Yokosuka (JP); Kunihiro Fujii, Yokosuka (JP); Shoji Kurakake, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 318 days.

(21) Appl. No.: 11/643,808

(22) Filed: Dec. 22, 2006

(65) Prior Publication Data

US 2007/0150300 A1 Jun. 28, 2007

(30) Foreign Application Priority Data

Dec. 27, 2005 (JP) .................................. 2005-375285

(51) Int. Cl.
*G06F 17/30* (2006.01)
(52) U.S. Cl. ..................................................... 707/767
(58) Field of Classification Search .................. 707/100, 707/1, 9, 784, 767
See application file for complete search history.

(56) References Cited

U.S. PATENT DOCUMENTS

| | | | | |
|---|---|---|---|---|
| 5,918,222 | A * | 6/1999 | Fukui et al. ........................ | 707/1 |
| 6,883,019 | B1 * | 4/2005 | Sengupta et al. ............. | 709/206 |
| 2002/0107920 | A1 * | 8/2002 | Hotti ............... | 709/204 |
| 2003/0169290 | A1 * | 9/2003 | Nishiyama et al. ............ | 345/738 |
| 2006/0156209 | A1 * | 7/2006 | Matsuura et al. ............. | 714/798 |
| 2007/0192409 | A1 * | 8/2007 | Kleinstern et al. ............ | 709/203 |

FOREIGN PATENT DOCUMENTS

| | | |
|---|---|---|
| EP | 1 574 974 A2 | 9/2005 |
| JP | 10-74206 A | 3/1998 |
| JP | 2000-99486 A | 4/2000 |
| JP | 2003-050820 A | 2/2003 |
| JP | 2004-271321 A | 9/2004 |
| JP | 2004-320217 A | 11/2004 |
| JP | 2005-100146 A | 4/2005 |
| WO | WO 01/86547 A2 | 11/2001 |
| WO | WO 03/083715 A1 | 10/2003 |

OTHER PUBLICATIONS

European Search Report dated Apr. 24, 2007 (Eight (8) pages).
Japanese Office Action dated Feb. 22, 2011 including English-language translation (Six (6) pages).
European Patent Office Action mailed Sep. 27, 2011.
"Matching User's Semantics with Data Semantics in Location-Based Services", Y. Shijun et al., 1st Workshop on Semantics in Mobile Environments, May 9, 2005, pp. 1-6.
"Task Knowledge Based Retrieval for Service Relevant to Mobile User's Activity", T. Naganuma et al., Jan. 1, 2005, The Semantic Web—ISWC 2005 Lecture Notes in Computer Science, LNCS, Springer, Berlin, DE pp. 959-973.

* cited by examiner

*Primary Examiner* — James Trujillo
*Assistant Examiner* — Amresh Singh
(74) *Attorney, Agent, or Firm* — Crowell & Moring LLP

(57) ABSTRACT

A service recommendation system and a service recommendation method capable of improving the probability of the estimation of a user task and recommending a service depending on a user task can be provided. The user role obtaining unit 210 of the service recommendation server 100 obtains the role of a user, and the task estimating unit 207 estimates a user task from a task model associated with the obtained user role and stored in the task knowledge DB 103. The service knowledge retrieving unit 208 retrieves a service capable of assisting a user task obtained from the task estimating unit 207.

6 Claims, 12 Drawing Sheets

FIG. 2

| ROLE | TASK ID | PARENT TASK ID | TASK NAME | STANDARD TIME AND LOCATION | TIME/LOCATION USE LOG | SELECTION FREQUENCY | ROLE CHANGING TASK |
|---|---|---|---|---|---|---|---|
| EMPLOYEE | 1000 | | GOING TO OFFICE | WEEKDAY, 8:00-10:00 | (8:10, A STATION) ··· | 121 | EMPLOYEE |
| | 1001 | 1000 | WATCHING NEWS | | | 23 | |
| | 1002 | 1000 | CHECKING TO DO LIST | | | | |
| | 1050 | 1000 | HAVING LUNCH | WEEKDAY, 11:30-14:00 | (12:03, OFFICE) ··· | 100 | |
| | 1051 | 1050 | SHOPPING AT CONVENIENCE STORE | | | 10 | |
| | 1052 | 1050 | EATING AT DINING HALL | | | | |
| | 1100 | 1000 | COMING HOME FROM OFFICE | WEEKDAY, 17:00-21:00 | (19:10, A STATION) ··· | 15 | FATHER |
| | 1101 | 1100 | WATCHING SPORTS NEWS | | | 2 | |
| | 1102 | 1100 | GOING TO PUB | | | | |
| | 4100 | 1000 | MEETING FRIEND | WEEKDAY, 17:00-21:00 | (19:12, A STATION) ··· | 15 | CLUB MEMBER |
| | 4101 | 4100 | GOING TO PUB | | | 2 | |
| | 4102 | 4100 | PLAYING BILLIARD | | | | |
| FATHER | 1000 | | GOING TO OFFICE | WEEKDAY, 8:00-10:00 | (8:10, HOME) ··· | 121 | EMPLOYEE |
| | 1001 | 1000 | WATCHING NEWS | | | 23 | |
| | 1002 | 1000 | CHECKING TO DO LIST | | | | |
| | 3000 | 1000 | GOING TO DEPARTMENT STORE | HOLIDAY | (10:00, A STATION) ··· | 59 | |
| | 3001 | 3000 | CHECKING EVENT INFORMATION | | | 23 | |
| | 3002 | 3000 | CHECKING SALES INFORMATION | | | | |
| | 1050 | 1000 | HAVING LUNCH | HOLIDAY, 12:00-14:00 | (14:00, X UNDERGROUND ARCADE) ··· | 10 | |
| | 1053 | 1050 | ORDERING PIZZA | | | 15 | |
| | 1054 | 1050 | GOING TO RESTAURANT | | | | |
| | 2000 | | BUYING SOUVENIR | | (17:10, Y STATION) ··· | 12 | |
| | 2001 | 2000 | BUYING TOY | | | 3 | |
| | 2002 | 2000 | BUYING CAKE | | | | |
| | 1100 | | COMING HOME FROM OFFICE | WEEKDAY, 17:00-21:00 | (19:10, A STATION) ··· | 15 | FATHER |
| | 1101 | 1100 | WATCHING SPORTS NEWS | | | 2 | |
| | 1102 | 1100 | BUYING FOODS | | | | |
| | 4100 | 1100 | MEETING FRIEND | WEEKDAY, 17:00-21:00 | (19:12, A STATION) ··· | 15 | CLUB MEMBER |
| | 4101 | 4100 | GOING TO PUB | | | 2 | |
| | 4102 | 4100 | PLAYING BILLIARD | | | | |
| CLUB MEMBER | 5000 | | PREPARING FOR TENNIS | | (10:00, Y STATION) ··· | 12 | |
| | 5001 | 5000 | RESERVATION FOR TENNIS COURT | | | 21 | |
| | 5002 | 5000 | BUYING TENNIS GOODS | | | | |
| | 1100 | | GOING HOME | WEEKDAY, 22:00-23:00 | (22:10, A STATION) ··· | 15 | FATHER |
| | 1101 | 1100 | WATCHING SPORTS NEWS | | | | |
| | 4100 | | MEETING FRIEND | WEEKDAY, 17:00-21:00 | (19:12, A STATION) ··· | 15 | CLUB MEMBER |
| | 4101 | 4100 | GOING TO PUB | | | 2 | |
| | 4102 | 4100 | PLAYING BILLIARD | | | | |

*FIG. 3*

| SERVICE ID | SERVICE URI | TASK ID |
|---|---|---|
| 1001 | http://*.a.jp | 1001 |
| 1002 | http://*.b.jp | 3001 |
| 1003 | http://*.c.jp | 4101 |
| 1004 | http://*.d.jp | 1005 |
| 1005 | http://*.e.jp | 1006 |

*FIG. 4*

| ROLE | STANDARD LOCATION |
|---|---|
| EMPLOYEE | OFFICE |
| FATHER | HOME |

*FIG. 5*

| USER GROUP | USER ROLE |
|---|---|
| COLLEAGUE | EMPLOYEE |
| CLUB | CLUB MEMBER |
| FAMILY | FATHER |
| ... | |

*FIG. 6*

| TERMINAL NUMBER | REGISTERED USER TERMINAL NUMBER | USER GROUP |
|---|---|---|
| 090-aaaa-bbbb | 090-1111-**** | COLLEAGUE |
| | 090-2222-**** | COLLEAGUE |
| | 090-3333-**** | CLUB |
| | 090-4444-**** | CLUB |
| | 090-5555-**** | FAMILY |
| | 090-6666-**** | FAMILY |
| | 090-7777-**** | FAMILY |
| ..... | .... | .... |

SERVICE RECOMMENDATION SYSTEM AND SERVICE RECOMMENDATION METHOD

BACKGROUND OF THE INVENTION

1. Field of the Invention

The present invention relates to a service recommendation system and a service recommendation method for recommending a service to a user.

2. Description of the Related Art

A conventional method for recommending a service can be, for example, JP2005-100146A (paragraph 0038 to 0041, 0062 to 0064, FIG. 6) for proposing a framework of storing in advance the action of a user in a real world (hereinafter referred to as a "task") associated with a service in a database, estimating a task of a user from the database, and presenting a service corresponding to the estimated task. Also proposed is a framework of classifying in advance a task possibly performed depending on the time and location, estimating a task of the user in accordance with the current time information and location information of the user, and presenting a service corresponding to the estimated task.

SUMMARY OF THE INVENTION

There are two problems with the above-mentioned frameworks. First, the user does not always perform a task at the same point in time and the same location. When the user performs the task at a different point in time and in a different location, it is difficult to appropriately estimate the task performed by the user. For example, assume that the time information "19:00" indicating a strong possibility that a task of "coming home" is performed, and the location information "A Station", and the time information "22:00" indicating a strong possibility that a task of "watching television" is performed, and the location information "home" and described. In this case, if the user is in "A Station" at "22:00" on his or her way home from office after the overtime, there occurs the problem that it cannot easily be estimated which task is to be taken, "going home" or "watching television".

Second, although the user performs a task at the same time in the same location, the task to be performed by the user can be different depending on whether the user is alone or accompanied by another user. However, in the above-mentioned conventional technology, the specified task is the same regardless of whether the user is alone or accompanied by another user, and no measure is taken to estimate a task depending on the relationship with another user. For example, when a user is in "A station" at "10:00 on weekday" on his or her way to a department store with his or her family on his or her paid leave, the task "going to office" is selected in the above-mentioned conventional technology.

As described above, in the conventional technology, the probability of the estimation of a task of a user is not sufficient because only the time and location are considered as the factors prescribing the action of the user, and the task of the user, the time, and the location are simply associated to set a model for estimation of the task.

The present invention has been developed to solve the above-mentioned problems, and aims at providing the service recommendation system and the service recommendation method capable of recommending a service depending on the task of the user by improving the probability of the estimation of the task of the user.

To solve the above-mentioned problem, the invention described in claim 1 provides a service recommendation system for recommending a service to a user includes: task model storing means for storing as a task model a set of tasks indicating user actions in association with a user role; user role obtaining means for obtaining a user role; task estimating means for estimating a user task from the task model based on the user role obtained by the user role obtaining means; and service retrieving means for retrieving a service capable of assisting the user task estimated by the task estimating means.

According to the present invention, the service recommendation system estimates the task of the user on the basis of the obtained role of the user. Therefore, the task can be estimated with the role taken into account as a factor prescribing the task of the user, and the probability of the estimation of the task of the user can be improved. Then, the service for assistance of the specified task of the user can be retrieved and a service corresponding to the task of the user can be recommended.

The invention described in claim 2 is based on the service recommendation system according to claim 1, and further includes: user location information obtaining means for obtaining user location information; and location-role correspondence storing means for storing location information associated with a user role when the user is located in a position specified by the location information. The user role obtaining means obtains from the location-role correspondence storing means the user role corresponding to the user location information obtained by the user location information obtaining means.

According to the present invention, a correct user role corresponding to the user location information can be obtained, and user task can be estimated based on the role. Therefore, the probability of the estimation of the user task can be improved.

The invention described in claim 3 is based on the service recommendation system described in claim 1, and further includes: user group storing means for storing a user group indicating a relationship between a user and another user; user group-role correspondence storing means for storing the user group associated with a role of the user in the user group; user location information obtaining means for obtaining the location information about the user; another user location information obtaining means for obtaining the location information about another user; and user group obtaining means for obtaining a corresponding user group from the user group storing means on a basis of the location information about the user obtained by the user location information obtaining means and the location information about another user obtained by another user location information obtaining means. The user role obtaining means obtains from the user group-role correspondence storing means a role corresponding to the user group obtained by the user group obtaining means.

According to the present invention, a user group is specified on the basis of the positional relationship between a user and another user, and a correct user role can be obtained on the basis of the user group. Therefore, the probability of the estimation of a user task can be improved.

The invention described in claim 4 is based on the service recommendation system described in claim 1, and the task model storing means stores a changed role of the user associated with a role changing task which changes a role of the user; and the user role obtaining means obtains the changed role of the user when the task estimating means estimate the role changing task as a task of the user.

According to the present invention, the user role can be set in the latest status by obtaining the changed user role when a role changing task is estimated as a user task, thereby improving the probability of the estimation of the user task.

The invention described in claim 5 is the service recommendation system described in claim 1, and includes: current time obtaining means for obtaining a current time; and user location information obtaining means for obtaining user location information. Each task stored in the task model storing means is associated with time information and location information, and the task estimating means estimates a task of the user by comparing a current time obtained by the current time obtaining means and the location information about the user obtained by the user location information obtaining means with the time information and the location information stored in the task model storing means.

According to the present invention, the user task can be estimated using the time information and the location information in addition to the user role. Therefore, the probability of the estimation of the user task can be improved.

The invention described in claim 6 is based on the service recommendation system described in claim 5. The system further includes: service use result obtaining means for obtaining location information and time information at a point in time when the user uses a service; and task knowledge update means for updating the location information and the time information corresponding to the task associated with the service using the location information and the time information obtained by the service use result obtaining means.

According to the present invention, the user task can be estimated using the use history of services by updating the location information and the time information corresponding to the task associated with the service, thereby improving the probability of the estimation of the user task.

The invention described in claim 7 provides a service recommendation method for recommending a service to a user, and includes: a task model storing step of storing as a task model a set of tasks indicating user actions in association with a user role; a user role obtaining step of obtaining a user role; a task estimating step of estimating a user task from the task model based on the user role obtained in the user role obtaining step; and a service retrieving step of retrieving a service capable of assisting the user task estimated by the task estimating step.

According to the present invention, by estimating the task of a user on the basis of the role of the user, the role can be considered as a factor prescribing the task of the user, thereby improving the probability of the estimation of the task of the user. Then, a service for assistance of the estimated user task can be retrieved, and a service corresponding to the user task can be recommended.

According to the present invention, the service recommendation system obtains a user role, and estimates a user task on the basis of the user role. Therefore, the task can be estimated with the role taken into account as a factor prescribing the user task, thereby improving the probability of the estimation of the user task. Then, a service for assistance of the estimated user task can be retrieved, and a service corresponding to the user task can be recommended.

BRIEF DESCRIPTION OF THE DRAWINGS

FIG. 2 shows an example of the data configuration of the task knowledge DB according to the mode for embodying the present invention;

FIG. 3 shows an example of the data configuration of the service knowledge DB according to the mode for embodying the present invention;

FIG. 4 shows an example of the data configuration of the location-role correspondence DB according to the mode for embodying the present invention;

FIG. 5 shows an example of the data configuration of the user group-role correspondence DB according to the mode for embodying the present invention;

FIG. 6 shows an example of the data configuration of the user group obtaining DB according to the mode for embodying the present invention;

DETAILED DESCRIPTION OF THE PREFERRED EMBODIMENTS

The mode for embodying the present invention is explained below by referring to the attached drawings.

Figure 1:
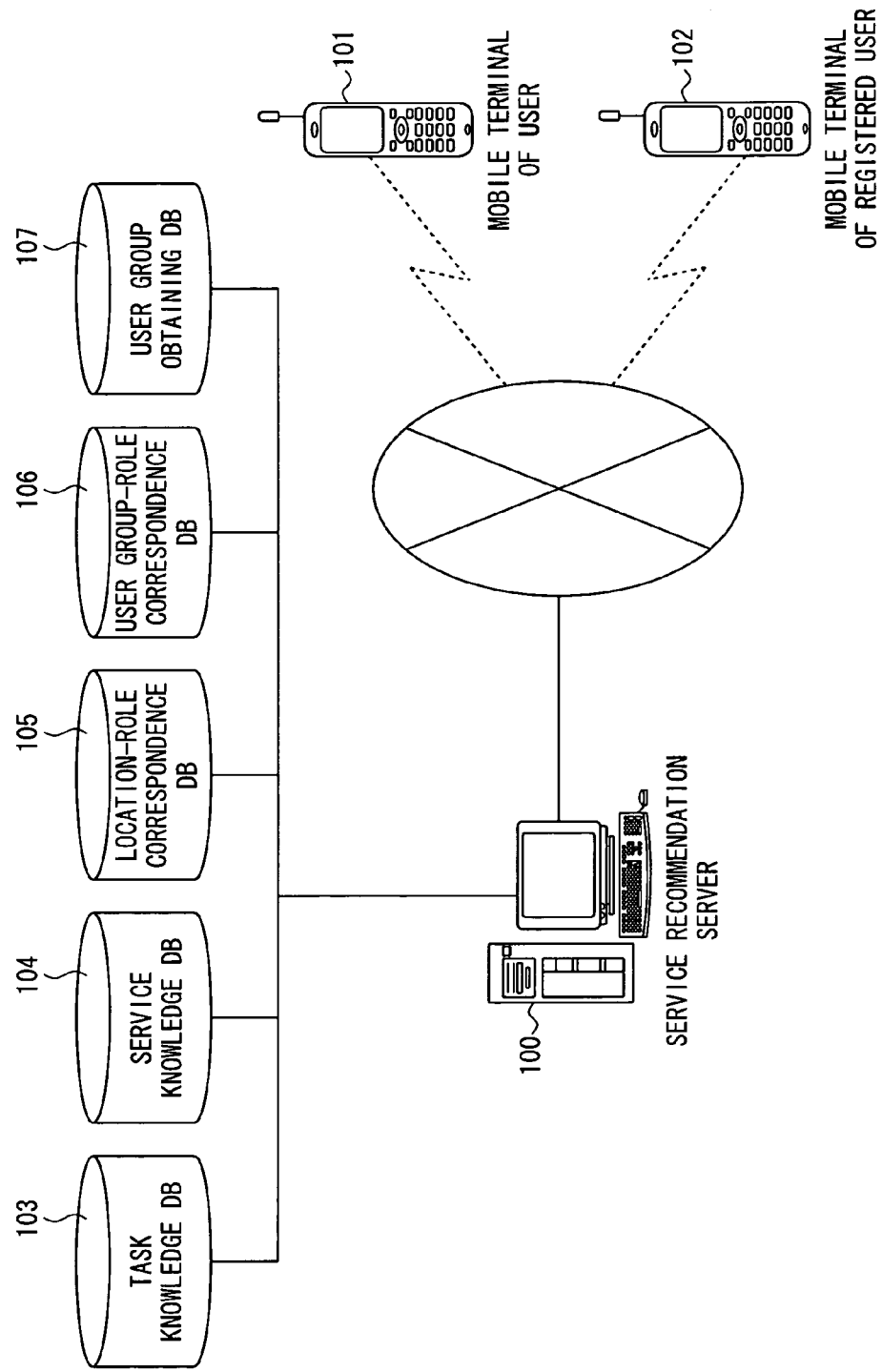
FIG. 1 shows the entire configuration of the service recommendation system according to the mode for embodying the present invention.

FIG. 1 shows the entire configuration of the service recommendation system according to the mode for embodying the present invention. As shown in FIG. 1, the service recommendation system is configured by a service recommendation server 100, a mobile terminal 101 possessed by a user, a mobile terminal 102 possessed by a registered user. The service recommendation server 100, the mobile terminal 101, and the mobile terminal 102 are connected to be able to communicate with a communication network such as a mobile communication network, the Internet, etc. A "registered user" refers to a user whose information has been registered in the mobile terminal 101.

<1.1 Configuration of Service Recommendation Server>

Next, the configuration of the service recommendation server 100 is explained in detail. The configuration of the hardware of the service recommendation server 100 includes a CPU (central processing unit), ROM (read only memory), RAM (random access memory), a hard disk device, an internal clock, and a communication interface although not shown in the attached drawings, and has a hardware configuration of a common computer. The hard disk device of the service recommendation server 100 stores various types of software such as a program, a database, etc. The database stored in the hard disk device can be a task knowledge DB (database) (corresponding to the "task model storing means") 103, a service knowledge DB 104, a location-role correspondence DB (corresponding to the "location-role correspondence storing means") 105, a user group-role correspondence DB (corresponding to the "user group-role correspondence storing means") 106, and a user group obtaining DB (corresponding to the "user group storing means") 107. The configuration of each database is explained below.

(1.1.1 Configuration of Task Knowledge DB)

First, the configuration of the task knowledge DB 103 is explained below. The task knowledge DB 103 stores as a task model a set of tasks associated with the role of a user. A "task" is the action of a user required for a user to reach the service. FIG. 2 shows an example of the data configuration of the task knowledge DB 103. As shown in FIG. 2, the task knowledge DB 103 includes as data items a "role" as a user role, a "task ID" as an identifier of a task associated with the role, a "parent task ID" as an identifier of a parent task which is an upper task to the current task, a "task name" indicating the contents of a task, a "standard time and location" when a task is performed by the above-mentioned role, a "time/location use log" indicating the history of the time and location in which the user has actually performed the task, a "selection frequency" of a service, and a "role changing task" indicating whether or not the task changes the role of the user (hereinafter referred to as a "role changing task").

A "role changing task" is described only when the task is a role changing task, and the "role changing task" describes a changed role. The task for which the "selection frequency" is described is only the end task (lowermost layer). The end task is directly associated with the service stored in the service knowledge DB 104, and the selection frequency increases with the timing of the user using the service.

A "time/location use log" describes the time and location in which a user performs a service in the first upper task above the end task directly associated with the service used by the user. Therefore, the total number of the frequency at which the "time/location use log" of a task is described matches the total number of selection frequency of the child task to the current task. The time/location use log of the task knowledge DB 103 and the selection frequency are prepared for each user. In this example, it is assumed that only a single user uses the service recommendation system, and the task knowledge DB 103 describes the use history of the user and the selection frequency. When a plurality of users use the service recommendation system, the user identifier may be added to the use history and the selection frequency and stored in the task knowledge DB 103. Otherwise, a history management DB including the items of a task ID, a user ID, a use history, and a selection frequency may be separately prepared.

(1.1.2 Service Knowledge DB)

The service knowledge DB 104 is explained below. The service knowledge DB 104 is a database in which a service for assistance in performing a task is defined. A service refers to the knowledge about the contents over the Internet and a service in the real world. FIG. 3 shows an example of the configuration of the data in the service knowledge DB 104. As shown in FIG. 3, the service knowledge DB 104 includes as data items a "service ID" as an identifier of a service, a "service URI (uniform resource identifier)" as an identifier of the location (access destination) of a service, and a "task ID" as an identifier of the task whose performance is assisted by the service.

(1.1.3 Location-Role Correspondence DB)

Next, the location-role correspondence DB 105 is explained below. The location-role correspondence DB 105 is a database for obtaining the role of a user from the location information about the user. FIG. 4 shows an example of the configuration of the data of the location-role correspondence DB 105. As shown in FIG. 4, the location-role correspondence DB 105 is provided with, as data items, a "standard location" in which a user role can be correctly determined and a "role" of the user when the user is in the location. For example, the standard role when a male user is in his "office" is an "employee", and the standard role when he is at "home" is a "father".

(1.1.4 User Group-Role Correspondence DB)

Next, the user group-role correspondence DB 106 is explained below. The user group-role correspondence DB 106 is a database for obtaining the role of a user from the user group to which the user belongs. FIG. 5 shows an example of the configuration of the data of the user group-role correspondence DB 106. As shown in FIG. 5, the user group-role correspondence DB 106 is provided with, as data items, a "user group" indicating the relationship between a user possessing the mobile terminal 101 and a registered user, and a "user role" of the user estimated when a user is accompanied by a registered user having each user group.

Using the user group-role correspondence DB 106, when a user is accompanied by, for example, a colleague, an "employee" as the role of the user can be obtained. When the user is accompanied by a member of a club, a "club member" can be obtained as the role of the user. When the user is accompanied by his family, a "father" can be obtained as the role of the user.

(1.1.5 User Group Obtaining DB)

Next, the user group obtaining DB 107 is explained below. The user group obtaining DB 107 is a database for obtaining a user group common between the users having the mobile terminal 101 and the registered user having the mobile terminal 102 when they are together (acting together). FIG. 6 shows an example of the configuration of the data of the user group obtaining DB 107. The user group obtaining DB 107 is configured by a "terminal number" as the telephone number of the mobile terminal 101, a "terminal number of a registered user" as the telephone number of the mobile terminal 102 possessed by a registered user, and a "user group" indicating the relationship between the registered user and the user having the mobile terminal 101. FIG. 6 shows only one example of the terminal number of the mobile terminal 101, but the terminal numbers of the mobile terminals 101 possessed by all users are stored in the user group obtaining DB 107.

(1.1.6 Configuration of Functions)

Figure 7:
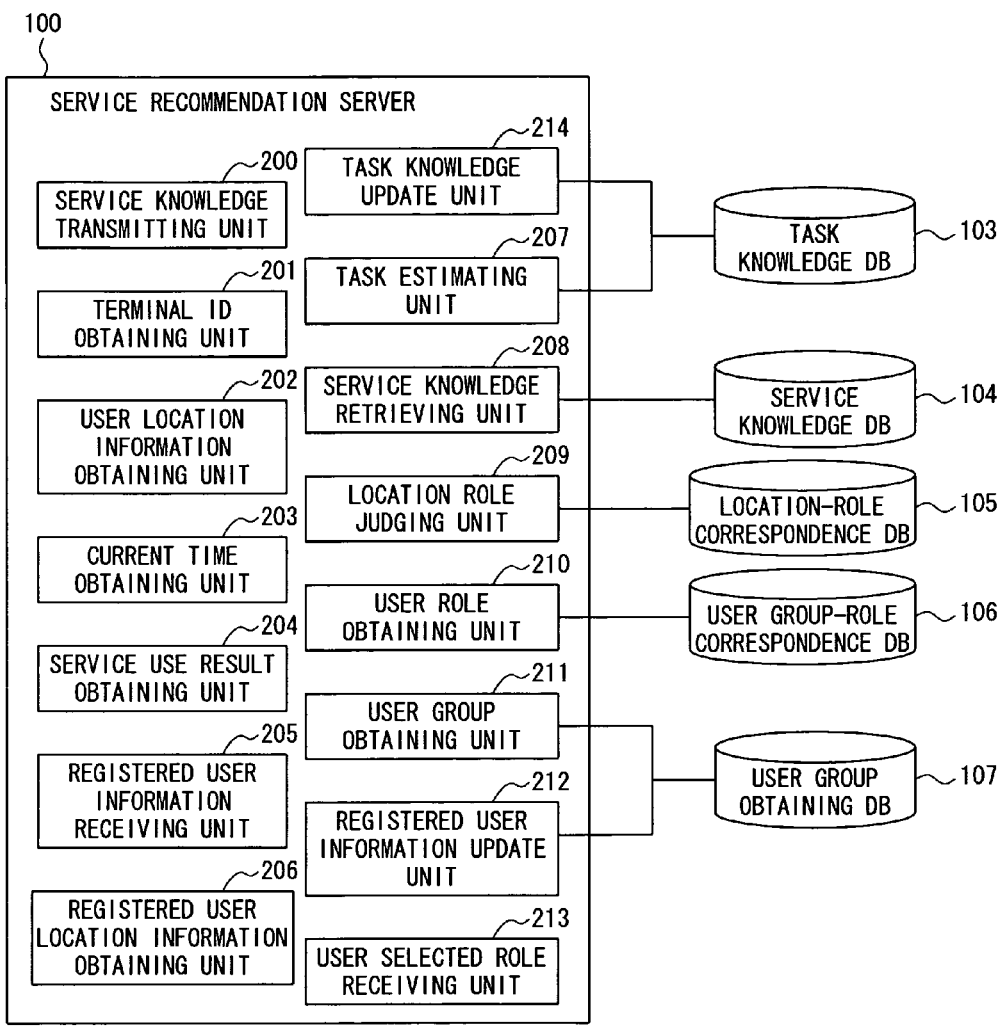
FIG. 7 is a block diagram showing the configuration of the functions of the service recommendation server according to the mode for embodying the present invention.

The configuration of the functions shown in FIG. 7 is realized on the service recommendation server 100 by the above-mentioned hardware provided for the service recommendation server 100 and software. The functions of each component are described below.

A terminal ID obtaining unit 201 obtains the ID of the mobile terminal 101. A telephone number corresponds to the ID of the mobile terminal 101.

A user location information obtaining unit 202 receives from the mobile terminal 101 the location information about the mobile terminal 101 as the user location information.

A location role judging unit 209 obtains from the location-role correspondence DB 105 the user role corresponding to the user location information.

A registered user information receiving unit 205 receives from the mobile terminal 101 the information (terminal ID, etc.) about the registered user registered in the mobile terminal 101.

A user group obtaining unit 211 obtains from the user group obtaining DB 107 the information about a registered user and a user group.

A registered user information update unit 212 updates the user group obtaining DB 107 when the information about the registered user registered in the mobile terminal 101 changes.

A registered user location information obtaining unit (corresponding to the "another user location information obtaining means") 206 receives the location information about the mobile terminal 102 possessed by a registered user.

The user group obtaining unit 211 obtains a user group of a registered user from the user group obtaining DB 107 on the basis of the user location information obtained by the user location information obtaining unit 202 and the location information about the registered user obtained by the registered user location information obtaining unit 206. Practically, when the user and the registered user matches in location information, the user and the registered user are judged as being together, and the user groups corresponding to the terminal number of the mobile terminal 101 and the registered user terminal number of the mobile terminal 102 are obtained from the user group obtaining DB 107.

A user role obtaining unit 210 determines the role of the user by obtaining from the user group-role correspondence DB 106 the role corresponding to the user group obtained by the user group obtaining unit 211. Furthermore, the obtained role of the user is stored and held.

A current time obtaining unit 203 obtains the current time from the internal clock.

A task estimating unit 207 estimates a user task from the task knowledge DB 103 on the basis of the role obtained by the user role obtaining unit 210. When a more probable task estimation is performed, user action is estimated by comparing the current time and the current user location information with the time information and location information ("time/location use log" or "standard time and location" of the task knowledge DB 103) corresponding to the task.

A service knowledge retrieving unit (corresponding to the "service retrieving means") 208 retrieves from the service knowledge DB 104 a service capable of assisting the user action estimated by the task estimating unit 207.

A service knowledge transmitting unit 200 recommends a service to a user by transmitting to the mobile terminal 101 of the user the service obtained in the retrieval performed by the service knowledge retrieving unit 208.

A service use result obtaining unit 204 obtains the use result of the service transmitted to the mobile terminal 101. The use result of the service includes the location information and the time information at the point in time when a service name and a service are used. A "point in time when a service is used" refers to, for example, the point in time when the user selects the service URI displayed on the mobile terminal 101.

A user selected role receiving unit 213 receives the role of the user selected by the user on the mobile terminal 101.

A task knowledge update unit 214 updates the task knowledge DB 103. In detail, using the location information and the time information obtained by the service use result obtaining unit 204, the task knowledge update unit 214 updates the "time/location use log" corresponding to the task associated with the service used by the user.

<1.2 Configuration of Mobile Terminal>

Next, the configurations of the mobile terminals 101 and 102 are explained below. Since the configuration of the mobile terminal 102 is similar to the configuration of the mobile terminal 101, the mobile terminal 101 is explained here. The mobile terminal 101 is a terminal having a wireless data communication function. A terminal corresponding to the mobile terminal 101 can be a cellular phone, a PHS (personal handyphone system), a PDA (personal digital assistance) provided with a wireless communication card, etc.

Figure 8:
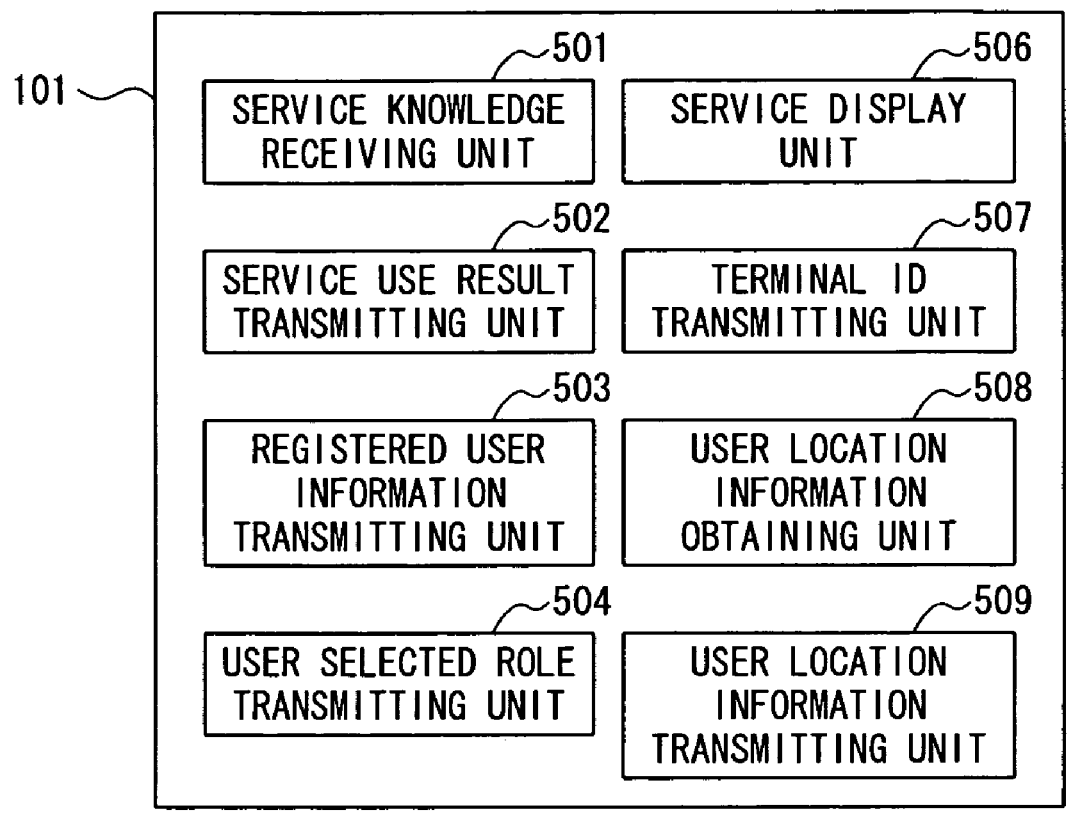
FIG. 8 is a block diagram showing the configuration of the functions of the mobile terminal according to the mode for embodying the present invention.

The mobile terminal 101 is provided with the hardware such as a CPU, memory, a wireless communication interface, a display, operation keys, etc. and the software stored in the memory. By the above-mentioned hardware and software provided for the mobile terminal 101, the configuration of the functions shown in FIG. 8 is realized. Each component is described below.

A service knowledge receiving unit 501 receives a candidate for a service from the service recommendation server 100.

A service display unit 506 displays the received service candidate on the mobile terminal 101.

A service use result transmitting unit 502 transmits a result of the use of a service by the user to the service recommendation server 100.

A terminal ID transmitting unit 507 transmits to the service recommendation server 100 a terminal ID of the mobile terminal 101.

A user location information obtaining unit 508 obtains user location information. A method for obtaining user location information can be using a GPS (global positioning system) installed into the mobile terminal 101, using the location information about a cellular base station, obtaining the information about an access point using a wireless LAN (local area network) function installed into the mobile terminal 101, using the use history at a station ticket gate for electronic money stored in the memory of the mobile terminal 101.

A user location information transmitting unit 509 transmits the user location information to the service recommendation server 100.

A user selected role transmitting unit 504 transmits a selected role to the service recommendation server 100 when the user selects any role from among the candidates for a user role displayed on the mobile terminal 101.

<2.1 Outline of Entire Service Recommendation System>

In the real world, the action of a user is prescribed by various factors. For example, they can be the social restrictions from the role recognition expected for the user, the occupation, the race, the culture, etc., and the character, the personality, etc. of a person configured by the purpose awareness, regulation awareness, self-awareness, etc. In these factors, the occupation of a user, the race, the culture, the character, and the personality hardly change in the daily life cycle. In the mode for embodying the present invention, the role expected for a user that can be changed depending on the user location, time, and the human relationship with the persons around the user is focused.

Figure 9:
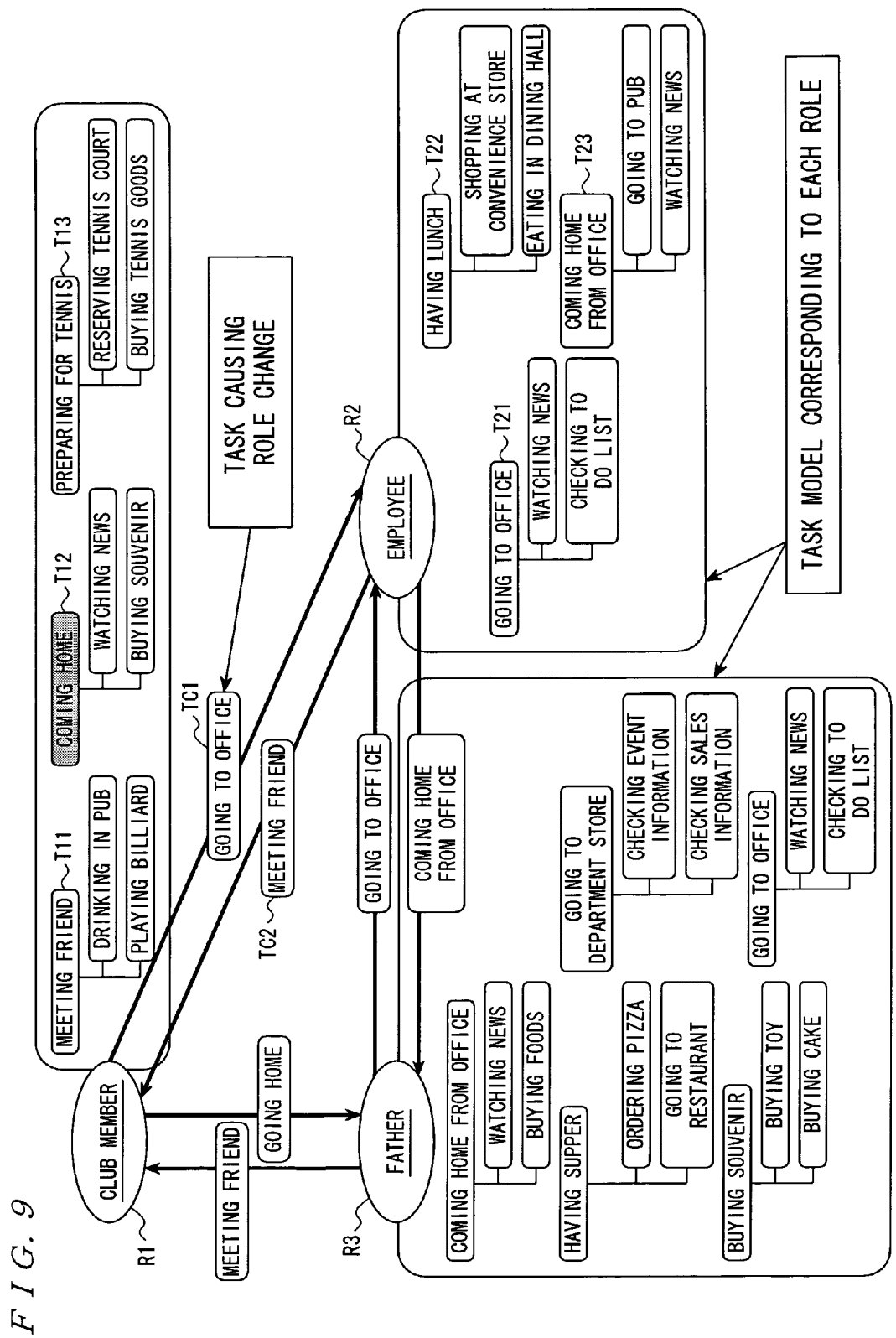
FIG. 9 shows a model prescribing the action of a user on the basis of the role concept according to the mode for embodying the present invention.

FIG. 9 shows a model prescribing the action of a user on the basis of a role. The action of a user prescribed by the role is collected as a set of task (hereinafter referred to also as a "task model"), and is associated with the role of the user in advance. For example, the role of a "club member R1" is associated with a set of tasks of "meeting a friend T11", "going home T12", and "preparing for tennis T13". The role "employee R2" is associated with a set of tasks of "going to office T21", "having lunch T22", and "going home from office T23". The user performs a task in a task model corresponding to a role while a certain role is held.

A change of a role occurs when a task is performed. The task model corresponding to each role includes a task ("role changing task") causing a change of a role of a user, and the task changes to another role by performing a role changing task in the task model. For example, the user leaving home for office in the morning has a role "father R3" changed into a role "employee R2" through the task "going to office TC1". When the user goes out to drink with a friend of a club on his way home from office, he has the role "employee R2" changed into the role "club member R1" through the task "meeting a friend TC2". After the role has changed, a task in a task model corresponding to the role after the change is performed.

Thus, it is considered that the user action can be prescribed by a role. Not in the entire task model, but using a task model classified in to each role of a user in task estimation, the retrieval space of a task can be prescribed, and an appropriate task can be estimated regardless of the fluctuation of a time and location. Furthermore, depending on the human relationship with an accompanying user, the role of a user and the task model can be prescribed, thereby a task can be appropriately estimated depending on the accompanying user.

Figure 10:
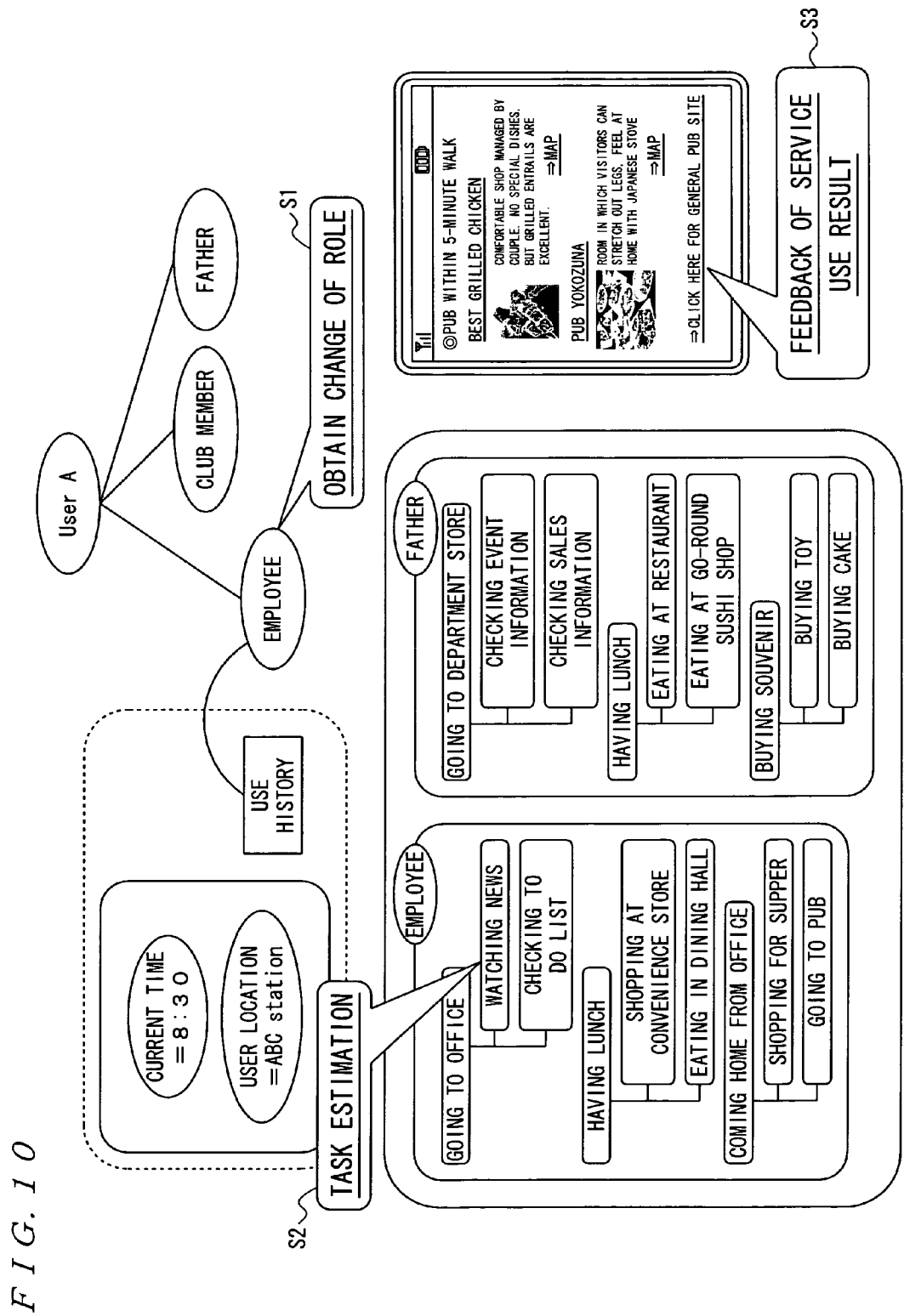
FIG. 10 shows the framework of the service recommendation on the basis of the role according to the mode for embodying the present invention.

FIG. 10 shows a framework of recommending a service on the basis of a role.

The service recommendation server 100 continuously holds the role of the same user until the role of the user changes. In step S1, the service recommendation server 100 obtains a change of a role depending on the performance of a task ("going home from office", etc.) that changes a role, the change of location information and time information, and the change of an accompanying user.

In step S2, the service recommendation server 100 obtains a task model corresponding to the role of a user from the task knowledge DB 103, and estimates a task most likely performed in the user location and time information as a user task in the tasks of the task model.

In step S3, a service use result is fed back. That is, the service recommendation server 100 adds the information about the point in time and location in which the user uses a service as an estimation condition of a task in the task model, and uses it when a task is estimated next time and when a service is determined next time.

<2.2 Process Flow>

Each process flow of the service recommendation server 100 and the mobile terminal 101 is explained below.

(2.2.1 Process Flow of Service Recommendation Server)

The process flow of the service recommendation server 100 is explained below by referring to FIG. 11.

First, the service recommendation server 100 aims at obtaining the role of the current user.

Practically, the service recommendation server 100 receives the location information about the mobile terminal 101 transmitted from the user location information transmitting unit 509 of the mobile terminal 101 by the user location information obtaining unit 202 as the location information about the user location (step S101).

Furthermore, the terminal ID transmitted from the terminal ID transmitting unit 507 of the mobile terminal 101 is obtained by the terminal ID obtaining unit 201, and the terminal ID of the registered user registered in the mobile terminal 101 is obtained from the user group obtaining DB 107 on the basis of the terminal ID (step S102).

Next, the registered user location information obtaining unit 206 receives from the user location information transmitting unit 509 of the mobile terminal 102 the location information about the mobile terminal 102 of the registered user as the location information about the place where the registered user is (step S103).

Next, on the basis of the obtained user location information and registered user location information, a role of the user is estimated. Practically, when there is a registered user having the same location information as the user (YES in step 104), the user group obtaining unit 211 obtains a user group of the registered user (step S105). Practically, the user groups corresponding to the terminal numbers of the mobile terminals 101 and 102 are obtained from the user group obtaining DB 107.

Next, the user role obtaining unit 210 obtains the role of a user corresponding to the obtained user group from the user group-role correspondence DB 106 (step S106).

On the other hand, if there is no registered user having the same location information as the user (NO in step S104), then the location role judging unit 209 refers to the location-role correspondence DB 105, and obtains the role of the user corresponding to the user location information. The location-role correspondence DB 105 has the description of only the location in which a role is clearly determined. Therefore, there can be the case where a role cannot be determined from the location of a user. In this case, the user role obtaining unit 210 continuously holds the role of the user currently held (step S107).

Next, the task estimating unit 207 of the service recommendation server 100 estimates the task currently performed by the user. Practically, the task estimating unit 207 refers to the task knowledge DB 103, and selects the task model corresponding to the current role of the user. In the selected task model, the task having the "time/location use log" closest to the current position of the user and time is selected (step S108). A method for selecting a task on the basis of the time and location can be, in addition to the method above, obtaining an average value of the information about the time and location in the "time/location use log", and selecting a task having the location and time closest to the average value. When the task knowledge DB 103 does not accumulate the "time/location use log" in the task knowledge DB 103, a task having the "standard time and location" set in advance in the task knowledge DB 103 closest to the current time and current location of the user is selected.

Next, it is judged whether or not the task estimated in step S108 is a "role changing task" causing a change in role (step S109). If it is the "role changing task" (YES in step S109), then the role defined in the "role changing task" in the task knowledge DB 103 is defined as the current (changed) role of the user (step S110).

Next, the task estimating unit 207 obtains the task having the highest service performing frequency from the end tasks directly connected to a plurality of services in a set of tasks lower than an estimated task (step S111). The service knowledge retrieving unit 208 obtains the service associated with the task obtained in step S111 from the service knowledge DB 104, and transmits the obtained service from the service knowledge transmitting unit 200 to the mobile terminal 101 (step S112). The mobile terminal 101 displays a role candidate together with the service knowledge.

Next, the user selects a role different from the role currently being held from among the role candidates displayed on the mobile terminal 101. When the service recommendation server 100 receives the role by the user selected role receiving unit 213 from the mobile terminal 101 (YES in step S113), the user role obtaining unit 210 obtains the role as a role of the current user (step S114), and the a task is estimated and a service is recommended again (steps S108 to S112). If the user-selected role cannot be received after a predetermined time (determined at any time or for every service) has passed from the transmission of a service, or if the service use result obtaining unit 204 receives a service use result, then it is judged that no role has been selected (NO in step S113).

Next, the task knowledge DB 103 is updated on the basis of the user service use result. Practically, when the service recommendation server 100 receives a service use result transmitted from the mobile terminal 101 in the service use result obtaining unit 204, it judges that a service has been used. A service use result is received only when a service has been used. If the service use result cannot be received after a predetermined time (determined at any time or for every service) has passed from the transmission of a service, then it is judged that no service has been used.

When a service has been used (YES in step S115), first, the task knowledge update unit 214 stores the user location information and time information at the point in time when a service has been used for the item "time/location use log" corresponding to the task estimated in step S108 among the tasks stored in the task knowledge DB 103 (step S116). Furthermore, the "selection frequency" of the task associated with the recommended service is incremented by 1 (step S17)

(2.2.2 Process Flow of Mobile Terminal)

The process flow of the mobile terminal 101 is explained below by referring to FIG. 12.

First, the mobile terminal 101 obtains the location information about the user by the user location information obtaining unit 508, and transmits the location information about the user from the user location information transmitting unit 509 to the service recommendation server 100 together with the terminal ID of the mobile terminal 101 (step S201). Then, if there is addition, deletion, or change with the information about the registered user registered in the mobile terminal 101 of the user after the previous transmission to the service recommendation server 100 (YES in step S202), the information about the registered user is transmitted from the registered user information transmitting unit 503 to the service recommendation server 100 together with the terminal ID of the mobile terminal 102 (step S203).

When the service knowledge receiving unit 501 receives a service from the service recommendation server 100 (YES in step S204), the service display unit 506 displays the services (step S205). At this time, on the screen, the received services are displayed, and at the same time, a menu list is displayed so that a user can select the current role of the user and another role.

When a service has been used by a user (YES in step S206), the service use result with a terminal ID added is transmitted from the service use result transmitting unit 502 to the service recommendation server 100 (step S207). Using the service, the menu list of the roles is cleared from the screen to maintain the current role. If the service is not used (NO in step S206), and the user selects a role different from the current role from the menu list of the role YES in step S208), the user-selected role is transmitted from the user selected role transmitting unit 504 to the service recommendation server 100 (step S209).

<2.3 Operation Example>

Next, a practical example of an operation in the service recommendation system is explained below. As a premise, the contents of the data shown in FIGS. 2 to 6 are stored in each database, and the terminal ID of the mobile terminal 101 is defined as "090-aaaa-bbbb".

(2.3.1 Example of a Scenario of User on the Way from Home to Department Store as a Family on Holiday)

An example of recommending a service to a user on his or her way as a family to a department store on a holiday is shown below. When the user gets up at home in the morning, the service recommendation server 100 holds the role "father" of the user in the user role obtaining unit 210. The role has not changed from the point in time when the role of the user changed from an "employee" to a "father" by the user performing the task "going home" yesterday.

Figure 11:
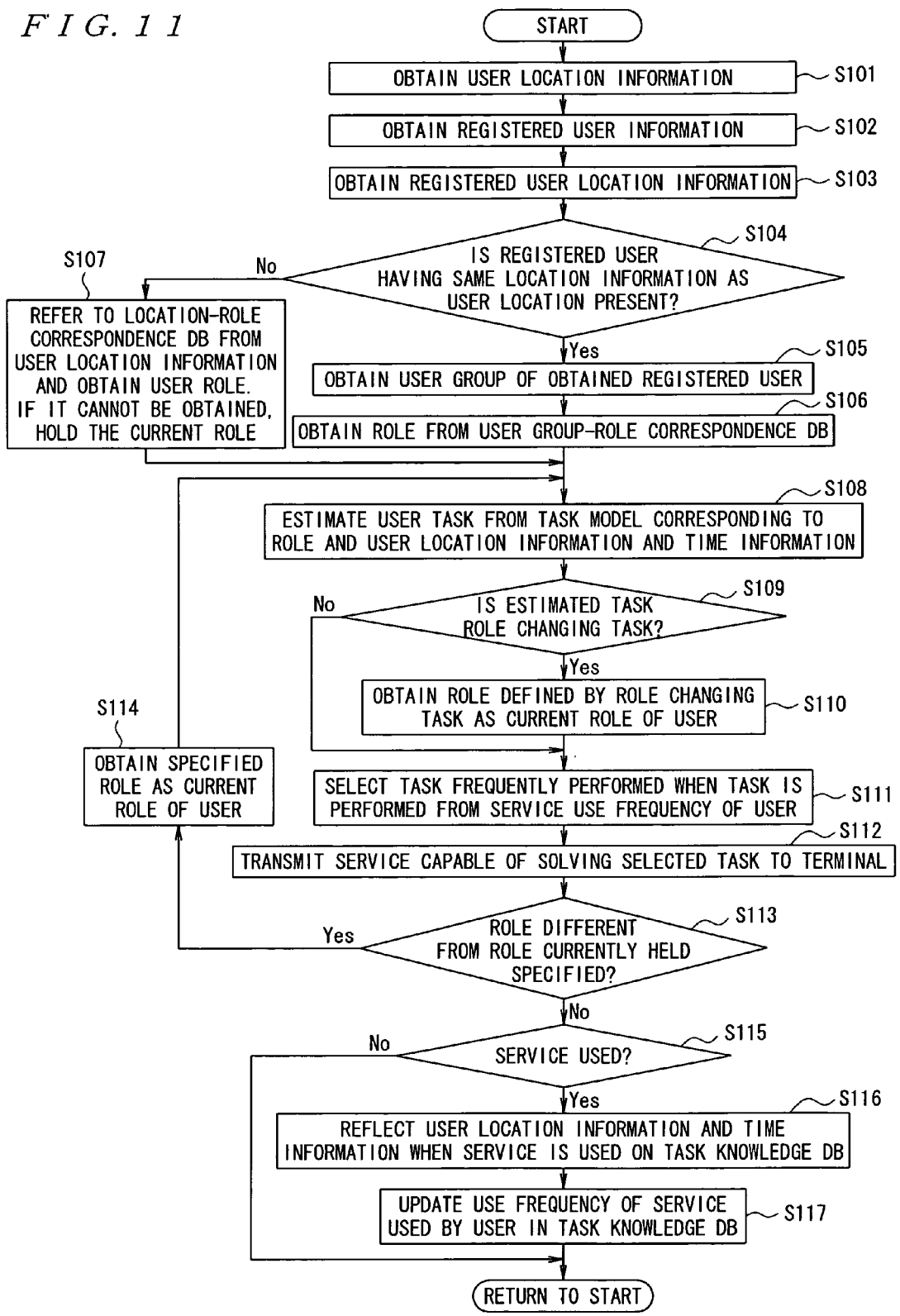
FIG. 11 shows the process flow of the service recommendation server according to the mode for embodying the present invention.

When the current role of the user is unclear, the role "father" corresponding to the location "home" can be acquired by referring to the location-role correspondence DB 105 in the location role judging unit 209 of the service recommendation server 100 (step S107 shown in FIG. 11). Otherwise, in the registered user location information obtaining unit 206, the location of the user registered in the mobile terminal 101 is measured, the registered user information (in this example, the registered user information is assumed to be the terminal number "090-5555-**" of the mobile terminal 102 possessed by a registered user) when the user location information matches the registered user location information is obtained, and in the user group obtaining unit 211, the user group "family" corresponding to the user terminal number "090-aaaa-bbbb" and the registered user terminal number "090-5555-" is obtained from the user group obtaining DB 107 shown in FIG. 6. Then, in the user role obtaining unit 210, the user group-role correspondence DB 106 shown in FIG. 5 is referred to, and the user role "father" corresponding to the user group "family" can be obtained (steps S105 and S106 shown in FIG. 11**).

The mobile terminal 101 possessed by a user constantly obtains location information, and the obtained location information is transmitted to the service recommendation server 100. The service recommendation server 100 constantly obtains a task model corresponding to the current role of the user from the task knowledge DB 103, a task is estimated on the basis of the location of the current user location and the time from the task model, and a service to be recommended is determined from the task and transmitted to the mobile terminal 101.

The user plans to go to a department store with his or her family by train from the A station. When they arrive at the A station, the location information of the user is "Station A" and the time is "10:00". The user and his family are awaiting a train.

The service recommendation server 100 first obtains the task model of the role "father" by the task estimating unit 207 from the task knowledge DB 103 shown in FIG. 2. In the task model, a task whose user location information "A station" and time information "10:00" matches the "time/location use log" is obtained (step S108 shown in FIG. 11). In this process, among the task models corresponding to the role "father", the task having the task ID "3000" of "going to a department store" corresponds to an appropriate task. Furthermore, among the tasks below the task "going to a department store", the end tasks (tasks described with "use frequency") are extracted, and a task having the highest use frequency in the end tasks is also extracted. In this example, the tasks ("checking the event information" of the task ID "3001", and "checking sales information" of the task ID "3002") below the task "going to a department store" are end tasks, the selection frequency of the task "checking the event information" is "59", and the selection frequency of the task "checking sales information" is "23". Therefore, the task having the highest selection frequency is "checking the event information". Then, in the service knowledge retrieving unit 208, the service (in this example, the service URI http://*.b.jp shown in FIG. 3) corresponding to the task ID "3001" of "checking the event information" is obtained from the service knowledge DB 104, and transmitted to the mobile terminal 101 of the user (step S112 shown in FIG. 11). In the mobile terminal 101, the service knowledge receiving unit 501 receives the service URI, and the service display unit 506 displays the service URI (step S205 shown in FIG. 12). When the service URI is selected from the user operation, the service display unit 506 accesses the Internet, and, for example, the screen on which the sales information as shown in FIG. 13 is indicated is displayed.

(2.3.2 Example of a Scenario when a User Leaves Home for Office)

Described below is the example of a scenario in which the user leaves home for office. The service recommendation server 100 holds the role "father" of the user in the user role obtaining unit 210 when the user stays at home. As described above, the service recommendation server 100 constantly obtains a task model from the current role of the user, estimates a user task on the basis of the user location and time from the task model, determines the service to be recommended from the tasks to the user, and transmits the service to the mobile terminal 101. The service recommendation server 100 refers to the task knowledge DB 103 shown in FIG. 2 in the task estimating unit 207, and obtains a task model corresponding to the user role "father". Furthermore, a task matching the time information "8:00 on weekday" and the location information "home" is estimated (step S108 shown in FIG. 11). In this example, in the task models corresponding to the role "father", the task ID "1000" of "going to office" corresponds to an appropriate task. Furthermore, from among the tasks below the task "going to office", the end tasks are extracted. From among the end tasks, the task having the highest use frequency is extracted. In this example, the tasks below the task "going to office" (the task "watching the news" having the task ID "1001", and the task "checking to do list" having the task ID "1002") are end tasks, the selection frequency of "watching the news" is "121", and the selection frequency of "checking to do list" is "23". Therefore, the task having the highest use frequency is "watching the news".

Figure 14:
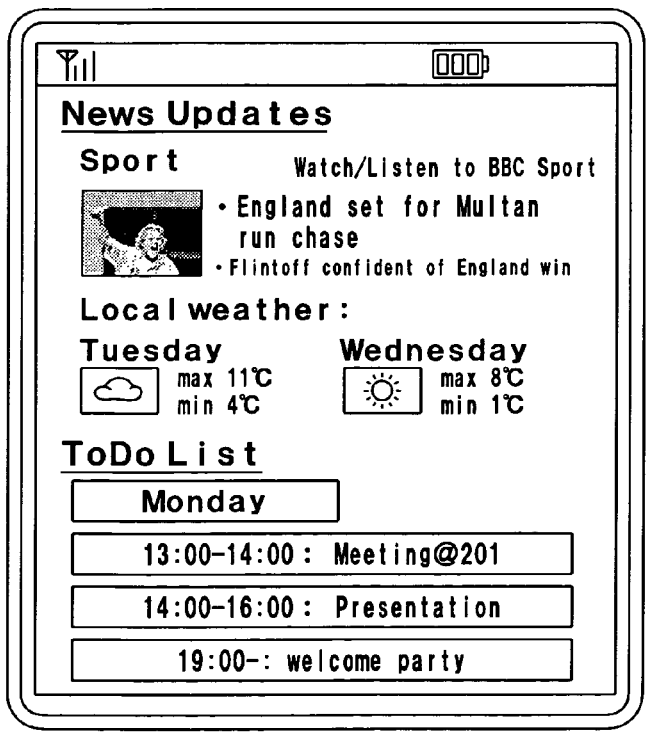
FIG. 14 shows an example of a service displayed on the mobile terminal according to the mode for embodying the present invention.

Next, in the service knowledge retrieving unit 208, the service (in this example, the service URI "http://*.a.jp" shown in FIG. 3) corresponding to the task ID "1000" of "watching the news" is obtained from the service knowledge DB 104, and transmitted to the mobile terminal 101 (step S112 shown in FIG. 11). Upon receipt of the service, the mobile terminal 101 displays the screen as shown in FIG. 14. In this example, not only the service relating to the task having the highest use frequency, but also the service relating to the task having the second highest use frequency can be simultaneously recommended to the user. In FIG. 14, the service relating to the task "checking to do list" having the second highest use frequency is simultaneously presented.

Furthermore, the task "going to office" corresponding to the role "father" in the task knowledge DB 103 describes the role changing task "employee". Therefore, the service recommendation server 100 obtains a changed role "employee" described in the role changing task as a current role of the user in the user role obtaining unit 210 (step S110 shown in FIG. 11), and the task model is obtained with the subsequent user role set as "employee", a task is estimated, and the estimated service is determined (steps S108 and S111 shown in FIG. 11).

(2.3.3 Example of Change of User Role by Human Relations)

Next, a practical example when a user role changes depending on human relations is explained below. Assume that a user waiting for a train at A station on his or her way home from office at about 19:00 encounters a friend from a club. The service recommendation server 100 checks whether or not there is a change in the user role on the basis of the user location information and the location information about the registered user registered in the mobile terminal 101 of the user, thereby obtaining the information about the change on the user role.

Practically, in the registered user location information obtaining unit 206, the location information about the registered user registered in the mobile terminal 101 of the user is measured (step S103 shown in FIG. 11). When the location information about the mobile terminal 101 of the user matches the location information about the registered user, the registered user information (in this example, the registered user information is the terminal number "090-3333-**" of the mobile terminal 102 possessed by a registered user) is obtained. The user group obtaining unit 211 obtains the user group "club" corresponding to the terminal number "090-aaaa-bbbb" of the mobile terminal 101 of the user and the terminal number "090-3333-" of the mobile terminal 102 of the registered user from the user group obtaining DB 107 shown in FIG. 6 (step S105 shown in FIG. 11), the user role obtaining unit 210 refers to the user group-role correspondence DB 106 shown in FIG. 5, and obtains the user role "club member" corresponding to the user group "club" (step S106 shown in FIG. 11**).

The service recommendation server 100 refers to the task knowledge DB 103 shown in FIG. 2 in the task estimating unit 207, and obtains a task model corresponding to the "club member" of the user role. Furthermore, it estimates a task matching the time information "19:00 on weekday" and the location information "A Station" (step S108 shown in FIG. 11). In this example, the task "meeting a friend" of the task ID "4100" corresponding to the role "club member" is selected. Furthermore, the end tasks in the tasks below the task "meeting a friend" are extracted, and the task having the highest use frequency in the end tasks is extracted. In this example, the tasks ("going to a pub" of the task ID "4101", and "playing billiard" of the task ID "4102") below the task "meeting a friend" are end tasks, the selection frequency of "going to a pub" is "15", and the selection frequency of "playing billiard" is "2". Accordingly, "going to a pub" has the highest use frequency.

Next, in the service knowledge retrieving unit 208, the service (in this example, the service URI http://*.c.jp shown in FIG. 3) corresponding to the task ID "4101" of "going to a pub" is obtained from the service knowledge DB 104, and transmitted to the mobile terminal 101 of the user (step S112 shown in FIG. 11).

Figure 12:
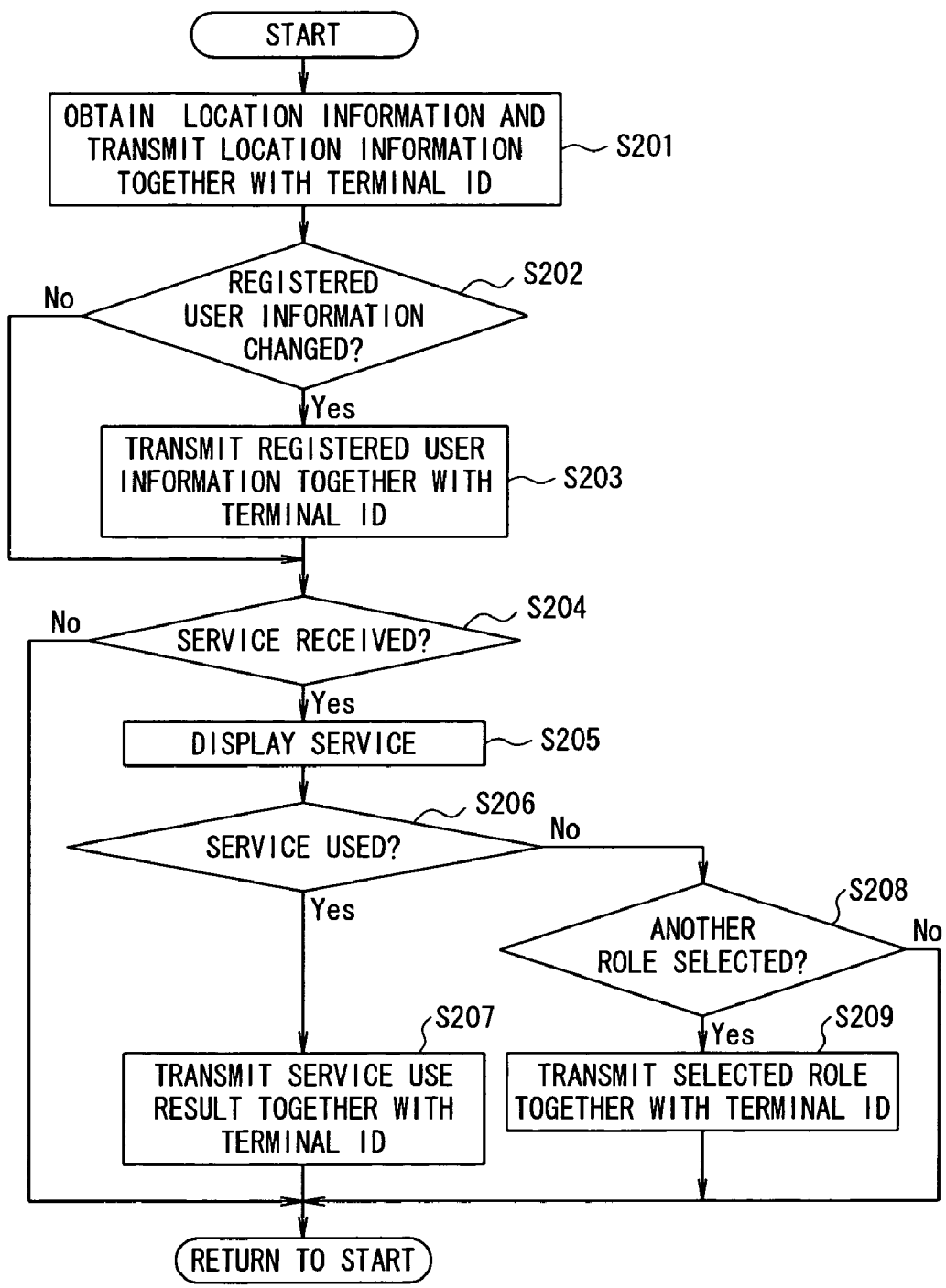
FIG. 12 shows the process flow of the mobile terminal according to the mode for embodying the present invention.
Figure 13:
FIG. 13 shows an example of a service displayed on the mobile terminal according to the mode for embodying the present invention.
Figure 15:
FIG. 15 shows an example of a service displayed on the mobile terminal according to the mode for embodying the present invention.

Upon receipt of the service, the mobile terminal 101 receives the service URI by the service knowledge receiving unit 501, and displays the service URI on the service display unit 506 (step S205 shown in FIG. 12). When the service URI is selected in the user operation, the service display unit 506 accesses the Internet, and displays the information about, for example, the pub as shown in FIG. 15.

As described above, the service recommendation server 100 obtains a user role, and estimates a user task on the basis of the obtained user role. Therefore, the task can be estimated with the role taken into account as a factor prescribing the user task, thereby improving the probability of the estimation of the user task. Then, a service for assistance of the estimated user task can be retrieved, and a service corresponding to the user task can be recommended.

Furthermore, the retrieval space can be prescribed using the task model classified for each user role as a target of the estimation of a task, not for the entire task model stored in the task knowledge DB 103, and the estimation of a task and the probability of a service can be improved.

Additionally, a user role can be determined and a task can be estimated depending on the human relations (user group) with an accompanying users thereby appropriately recommending a service depending on an accompanying user.

In addition, the past use history is fed back for each user, and a personal adaptation can be realized in estimating a task and determining a service.

<3. Variation Example>

As described above, the mode for embodying the present invention is explained above, but the present invention is not limited to the mode for embodying the present invention, and many variations within the range of the technological concept can be realized. Variation examples are listed below.

(1) The system configuration and the configuration of database described in the above-mentioned mode for embodying the present invention are only examples.

For example, in the above-mentioned mode for embodying the present invention, the service recommendation server 100 is provided with all components shown in FIG. 7, but the present invention is not limited to this application, and the component can be distributed to another or a plurality of devices.

Furthermore, in the above-mentioned mode for embodying the present invention, various databases are stored in the hard disk device of the service recommendation server 100. However, the present invention is not limited to this configuration, and the service recommendation server 100 can access a database device as an external device to obtain various types of information.

(2) In the above-mentioned mode for embodying the present invention, the mobile terminal 101 stores the registered user information, but the present invention is not limited to this application. For example, the registered user information is not stored in the mobile terminal 101, and various processes can be performed using only registered user information stored in the user group obtaining DB 107.

(3) In the above-mentioned mode for embodying the present invention, the location information and the time information are included in the service use result at the point in time when a service is used, and the task knowledge update unit 214 updates the "time/location use log" of the task knowledge DB 103 on the basis of the location information and the time information. However, the present invention is not limited to this configuration. For example, the service recommendation server 100 can obtain the user location information and time information at the point in time when the service use result is received, and the "time/location use log" of the task knowledge DB 103 can be updated on the basis of the location information and the time information.

(4) In the above-mentioned mode for embodying the present invention, it is judged that the user and the registered user act together when the location information about the user and that about the registered user match. However, the judgment condition is not limited to this. For example, it also can be judged that the user and the registered user acts together when the difference between the location of the user and the location of the registered user is within a predetermined threshold (for example, 2 metres).

The present invention can be used in estimating the task of a user with high probability and recommending a service for assistance when a task is performed.

What is claimed is:

1. A computer readable medium storing a program for executing on a computer a process for recommending a service that refers to knowledge about contents over the Internet or a service in the real world to a user, the process comprising:

storing in a task knowledge database as a task model a user role of a user, a set of tasks indicating user actions necessary for the user to reach the service, a role changing task that changes the user role, and time and location information in association with each of the tasks;

obtaining a current user role;

receiving the location information on a current location on the user;

estimating task of the user from the task model stored in the task knowledge database based on the current user role and the location information of the user received;

when the estimated task estimates the role changing task to be the task of the user, obtaining a changed user role corresponding to the role changing task;

setting the changed user role as the current user role when the estimated task is estimated to be the task of the user;

retrieving from a service knowledge database based on the current user role a service capable of assisting the user task estimated, the service knowledge database including a service ID that is an identifier of a service, a service uniform resource identifier (URI) that is an identifier of a location of a service, and a task ID that is an identifier of each of the tasks; and transmitting to a mobile terminal possessed by the user the service obtained in the retrieving.

2. A service recommendation method for recommending a service that refers to knowledge about contents over the Internet or a service in the real world to a user, the method comprising:

storing in a task knowledge database as a task model a user role that is a role of a user, a set of tasks indicating user actions necessary for the user to reach the services, a role changing task that changes the user role, and time and location information in association with each of the tasks;

obtaining a current user role;

receiving the location information on a current location on the user;

estimating task of the user from the task model stored in the task knowledge database based on the current user role and the location information of the user received;

when the estimated task estimates the role changing task to be the task of the user, obtaining a changed user role corresponding to the role changing task;

setting the changed user role as the current user role when the estimated task is estimated to be the task of the user;

retrieving from a service knowledge database based on the current user role a service capable of assisting the user task estimated, the service knowledge database including a service ID that is an identifier of the service, a service uniform resource identifier (URI) that is an identifier of a location of the service, and a task ID that is an identifier of each of the tasks; and transmitting to a mobile terminal possessed by the user the service obtained in the retrieving.

3. The service recommendation method according to claim 2, further comprising:

storing location information associated with the user role when the user is located in a position specified by the location information.

4. The service recommendation method according to claim 2, further comprising:

storing a user group indicating a relationship between the user and another user;

storing the user group associated with the user role in the user group;

obtaining the location information about the user;

obtaining location information about another user; and obtaining a corresponding user group from the storing on a basis of the location information about the user obtained and the location information about said another user obtained, wherein the current user role corresponding to the user group is obtained.

5. The service recommendation method according to claim 2, further comprising:

obtaining a current time; and obtaining user location information, wherein each task stored is associated with time information and location information; and the current user task is estimated by comparing the current time obtained and the location information about the user obtained with the time information and the location information stored, respectively.

6. The service recommendation method according to claim 5, further comprising:

obtaining the location information and the time information at a point of time when the user uses the service; and updating the location information and the time information corresponding to the task associated with the service by using the location information and the time information obtained.

* * * * *